(12) United States Patent
Lu

(10) Patent No.: US 6,780,124 B2
(45) Date of Patent: Aug. 24, 2004

(54) GOLF CLUB HEAD FOR WELDING

(75) Inventor: Yuan-Ping Lu, Taipei (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 0 days.

(21) Appl. No.: 10/335,918

(22) Filed: Jan. 3, 2003

(65) Prior Publication Data

US 2004/0097300 A1 May 20, 2004

(51) Int. Cl.[7] .................................................. A63B 53/04
(52) U.S. Cl. ........................................ 473/342; 473/345
(58) Field of Search ............................. 473/342, 324, 473/345, 349

(56) References Cited

U.S. PATENT DOCUMENTS

| | | | | | |
|---|---|---|---|---|---|
| 5,303,922 A | * | 4/1994 | Lo | ............................. | 473/330 |
| 5,536,006 A | * | 7/1996 | Shieh | ........................ | 473/342 |
| 5,564,994 A | * | 10/1996 | Chang | ........................ | 473/342 |
| 5,709,615 A | * | 1/1998 | Liang | ........................ | 473/324 |
| 5,713,800 A | * | 2/1998 | Su | ............................. | 473/342 |
| 6,238,302 B1 | * | 5/2001 | Helmstetter et al. | ........ | 473/340 |
| 6,273,832 B1 | * | 8/2001 | Helmstetter et al. | ........ | 473/324 |
| 6,299,549 B1 | * | 10/2001 | Shieh | ........................ | 473/342 |
| 6,328,661 B1 | * | 12/2001 | Helmstetter et al. | ........ | 473/324 |
| 6,336,869 B1 | * | 1/2002 | Hettinger et al. | ........... | 473/324 |
| 6,632,391 B1 | * | 10/2003 | Helmstetter et al. | ........ | 264/319 |

* cited by examiner

*Primary Examiner*—Raleigh W. Chiu
(74) *Attorney, Agent, or Firm*—Bacon & Thomas, PLLC

(57) ABSTRACT

A golf club head includes a golf club head body and a striking plate. The golf club head body has an opening on a front side thereof, with a flange being formed on the front side and extending along an outer peripheral edge defining the opening. A plurality of engaging notches are defined in the flange. The striking plate has a plurality of supporting rods. Each supporting rod is engaged in an associated one of the engaging notches when the striking plate is inserted into the opening of the golf club head body to thereby support the striking plate and to thereby position the striking plate in the opening of the golf club head body before high energy welding.

16 Claims, 3 Drawing Sheets

GOLF CLUB HEAD FOR WELDING

BACKGROUND OF THE INVENTION

1. Field of the Invention

The present invention relates to a golf club head for welding. In particular, the present invention relates to a golf club head that allows easy examination of the position of the striking plate.

2. Description of the Related Art

Conventional tungsten inert gas arc welding (so-called "TIG") for welding a striking plate to a golf club head has gradually been replaced by high energy welding such as laser beam welding (LBW) and plasma arc welding (PAW). The structure of the golf club head is modified in response to the change of the welding method.

FIG. 1 of the drawings is a sectional view of a conventional golf club head body and a striking plate suitable for high energy welding. FIG. 2 is an enlarged view of a circled portion in FIG. 1. Designs of the golf club head body 10 and the striking plate 20 are based on the characteristics of concentration and penetration of thermal energy for carrying out welding. Generally, the golf club head body 10 includes an opening 11 in a front side thereof and a flange 12 formed on the front side and extending along an outer peripheral edge defining the opening 11. A gap less than 1 mm is left between the golf club head body 10 and the striking plate 20 when the striking plate 20 is mounted into the opening 11 of the golf club head body 10. With such a structure, high energy welding is carried out, which melts the flange 12 to provide connecting material 13 that connects the striking plate 20 to the golf club head body 10. Although the structures of the golf club head body 10 and the striking plate 20 are suitable for high energy welding due to the advantages of small welding width, greater welding depth, and better welding quality, the striking plate 20 is apt to deviate from a general plane on which the opening 12 lies before the first welding procedure (i.e., point welding) and the subsequent high energy welding. This is because the gap (i.e., tolerance) between the golf club head body 10 and the striking plate 20 is so small that the striking plate 20 is apt to incline inward or outward or shift relative to the golf club head body 10. As a result, the resultant golf club head would be a disqualified one if the deviation of the striking plate 20 is not corrected before the welding procedure.

SUMMARY OF THE INVENTION

An object of the present invention to provide a golf club head that includes a plurality of engaging notches, and a plurality of supporting rods are provided on the striking plate. When the striking plate is inserted into the opening of the golf club head, the supporting rods on the striking plate are inserted into the engaging notches. Thus, the striking plate is precisely positioned after the first welding procedure and before the high energy welding. The assembly convenience is improved, and the welding procedure is simplified.

Another object of the present invention is to provide a plurality of examining notches on the flange to allow a worker to examine the position of the striking plate in the opening of the golf club head after the first welding procedure and before the high energy welding.

A further object of the present invention is to provide an inclined face on an outer side of the flange such that the flange that is molten during the high energy welding flows into a gap between the striking plate and the golf club head body, thereby improving the welding quality and the welding strength.

A golf club head in accordance with the present invention includes a golf club head body and a striking plate. The golf club head body has an opening on a front side thereof, with a flange being formed on the front side and extending along an outer peripheral edge defining the opening. A plurality of engaging notches are defined in the flange. The striking plate has a plurality of supporting rods. Each supporting rod is engaged in an associated one of the engaging notches when the striking plate is inserted into the opening of the golf club head body to thereby support the striking plate and to thereby position the striking plate in the opening of the golf club head body before high energy welding.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 3:
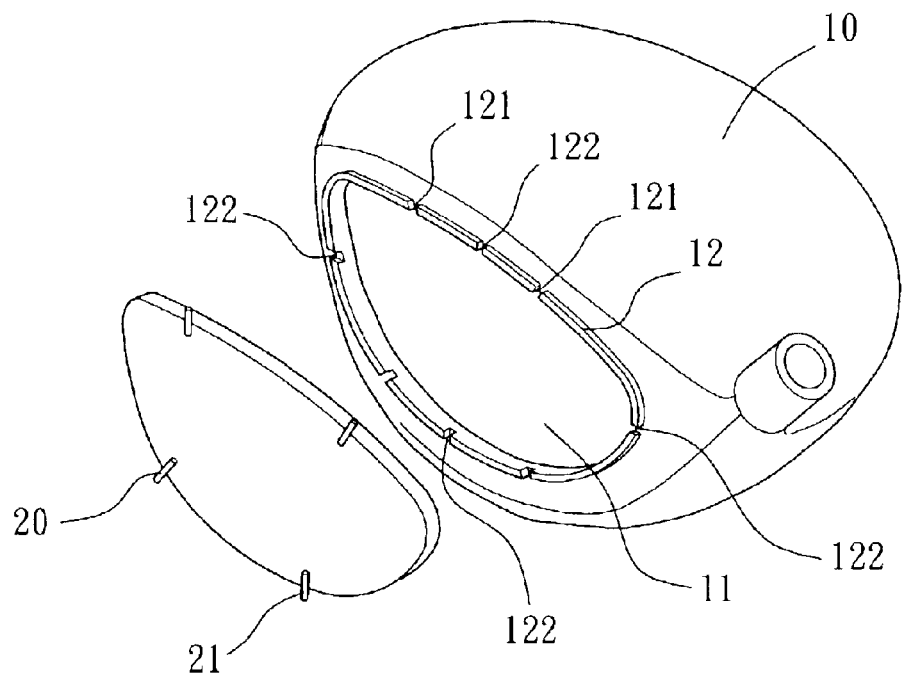
FIG. 3 is an exploded perspective view of a golf club head in accordance with the present invention.
Figure 4:
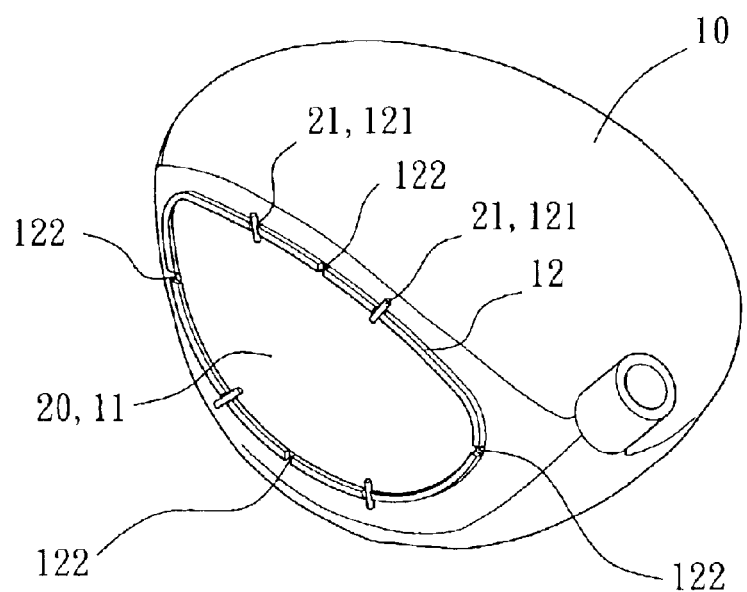
FIG. 4 is a perspective view of the golf club head in accordance with the present invention.
Figure 5:
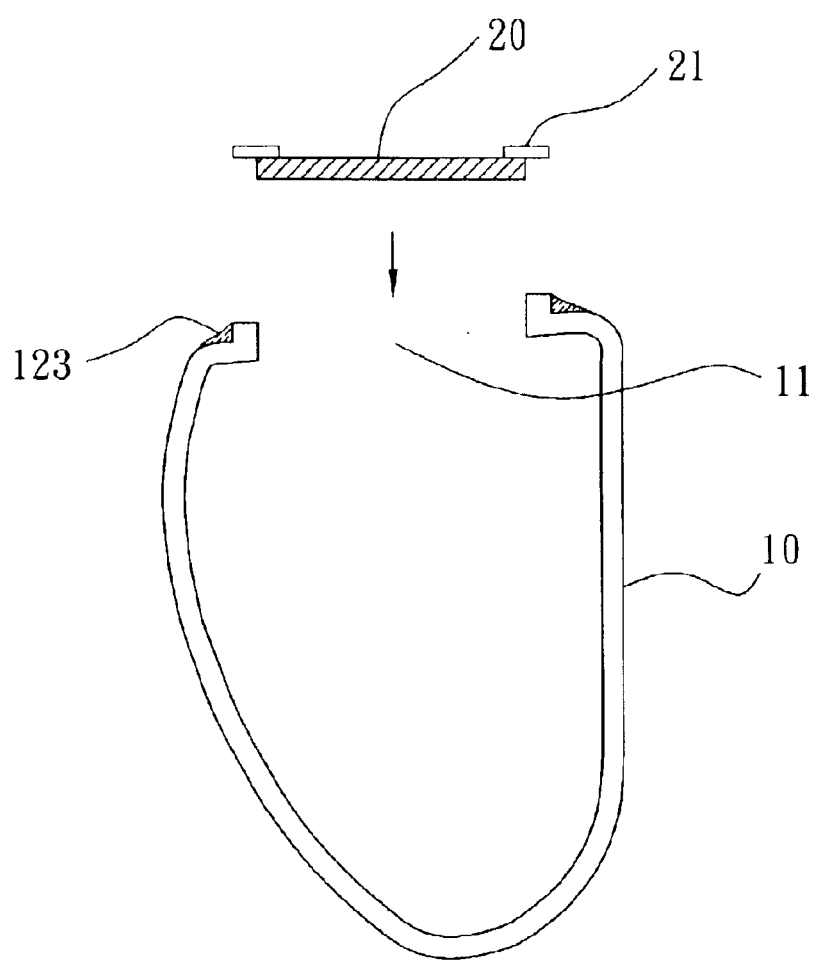
FIG. 5 is a sectional view illustrating a modified embodiment of the golf club head in accordance with the present invention.

FIG. 3 is an exploded perspective view of a golf club head in accordance with the present invention. FIG. 4 is a perspective view of the golf club head in accordance with the present invention. FIG. 5 is a sectional view illustrating a modified embodiment of the golf club head in accordance with the present invention.

The elements of the golf club head in accordance with the present invention are designated by similar reference numerals for those of the conventional golf club head, and detailed description of the structure as well as the function is omitted.

Referring to FIGS. 3 and 4, a golf club head in accordance with the present invention generally includes a golf club head body 10 and a striking plate 20. The golf club head body 10 includes an opening 11 in a front side thereof and a flange 12 formed on the front side and extending along an outer peripheral edge defining the opening 11. The golf club head body 10 is preferably made from iron, stainless steel, or alloy (preferably titanium alloy). Of more importance, a plurality of engaging notches 121 and a plurality of examining notches 122 are defined in the flange 12 and spaced from one another. Preferably, the examining notches 122 and the engaging notches 121 are disposed alternately.

A plurality of supporting rods 21 are provided on an outer side of the striking plate 20, with each supporting rod 21 having a portion extending out of the striking plate 20. In assembly, the striking plate 20 is inserted into the opening 11 of the golf club head body 10, with the portion of each supporting rod 21 being inserted into an associated one of the engaging notches 121 of the flange 12 to thereby support the striking plate 20. The assembly convenience is improved, and the welding procedure is simplified, as the striking plate 20 is precisely positioned with the provision of the supporting rods 21 and the engaging notches 121. The examining notches 122 allow the worker to rapidly examine, with eyes or equipment, the position of the striking plate 20; namely, the examining notches 122 allow the worker to examine, during the assembling procedure, whether the striking plate 20 is located on the plane on which the opening 11 of the golf club head body 10 lies. Preferably, there are four examining notches 122 respectively located in an upper portion, a left portion, a right portion, and a bottom portion of the flange 12. Preferably, each examining notch is located in the middle between two of the engaging notches adjacent to each other. Thus, the worker can rapidly examine the position after the first welding step and before the high energy welding. The engaging notches 121 and the examining notches 122 can be arranged in any desired manner.

The supporting rods 21 may be fixed on the outer side of the striking plate 20 by means of welding. Alternatively, the supporting rods 21 are integrally formed on the outer side of the striking plate 20 as a single unit. As mentioned above, after the first welding procedure and before the high energy welding, the worker can rapidly examine the position of the striking plate 20 in the opening 11 of the golf club head body 10 via the examining notches 122. If the striking plate 20 is not located in the proper position, it can be connected before the high energy welding.

Figure 2:
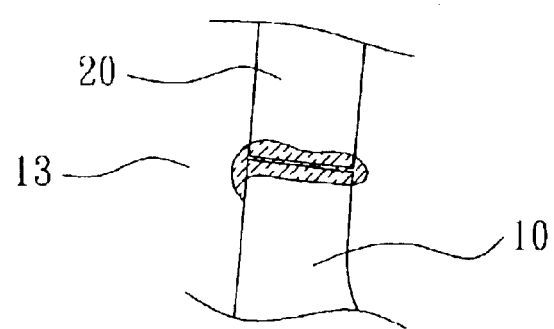
FIG. 2 is an enlarged view of a circled portion in FIG. 1.

FIG. 5 illustrates a modified embodiment of the golf club head in accordance with the present invention. In this embodiment, the flange 12 includes an inclined face 123 on an outer side thereof. The inclined face 123 of the flange 12 is so configured that the flange 12 that is molten during the high energy welding provides connecting material 13 (similar to the connecting material 12 in FIG. 2) that is apt to flow into the gap between the striking plate 20 and the golf club head body 10. Thus, a sufficient amount of connecting material 13 is filled into the gap between the striking plate 20 and the golf club head body 10 to thereby ensure the welding strength and the welding quality.

In the first embodiment and the second embodiment of the golf club head in accordance with the present invention, the thickness of the striking plate 20 is preferably 0.5–4 mm, the width of the flange 12 is preferably 1.5±0.2 mm, and the thickness of the flange 12 is preferably 1.5±0.2 mm. The width of each engaging notch 121 is preferably 1.5±0.2 mm, and the width of each examining notch 122 is preferably 1.0±0.2 mm. Preferably, each examining notch 122 is sector-like and tapers outward to thereby enlarge the viewable range by the worker's eyes or equipment.

Figure 1:
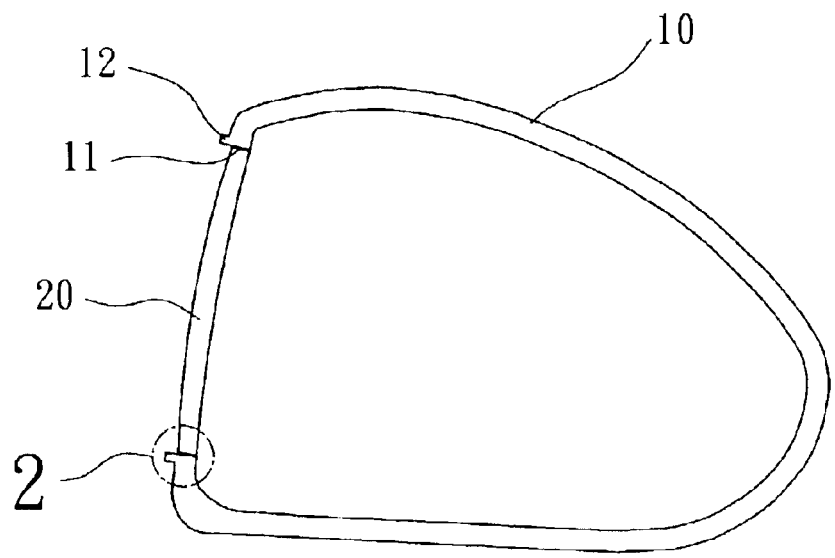
FIG. 1 is a sectional view of a conventional golf club head.

As compared with FIG. 1, the engaging notches 121 in the flange of the golf club head body 10 and the supporting rods 21 on the striking plate 20 provide reliable support. Further, the examining notches 122 in the flange 12 of the golf club head body 10 allows rapid examination of the position of the striking plate 20. Thus, the striking plate 20 and the golf club head body 10 can be assembled with each other before the first welding procedure (point welding) and the high energy welding. In conclusion, the assembly convenience is improved, the welding procedure is simplified, and the position of the striking plate 20 can be rapidly examined.

Although the invention has been explained in relation to its preferred embodiments as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A golf club head comprising:
   a golf club head body made of first metal, said golf club head including an opening on a front side thereof, with a flange being formed on the front side and extending along an outer peripheral edge defining the opening, a plurality of engaging notches being defined in the flange and regarded as aligning means for precise welding; and
   a striking plate made of second metal, said striking plate including a plurality of supporting rods, each said supporting rod being engaged in an associated one of the engaging notches when the striking plate is inserted into the opening of the golf club head body to thereby support the striking plate and to thereby align the striking plate with a common plane of the opening of the golf club head body for following high energy welding.

2. The golf club head as claimed in claim 1, wherein the flange of the golf club head body further includes a plurality of examining notches defined therein.

3. The golf club head as claimed in claim 1, wherein the flange includes an inclined face on an outer side thereof.

4. The golf club head as claimed in claim 1, wherein the flange of the golf club head body further includes four examining notches respectively defined in an upper portion, a left portion, a right portion, and a bottom portion of the flange.

5. The golf club head as claimed in claim 2, wherein the examining notches and the engaging notches are alternately disposed.

6. The golf club head as claimed in claim 4, wherein the examining notches and the engaging notches are alternately disposed.

7. The golf club head as claimed in claim 1, wherein the number of the engaging notches in the flange of the golf club head body is four, with the four engaging notches being respectively located in an upper portion, a left portion, a right portion, and a bottom portion of the flange.

8. The golf club head as claimed in claim 7, wherein the flange of the golf club head body further includes four examining notches respectively defined in an upper portion, a left portion, a right portion, and a bottom portion of the flange, and wherein the examining notches and the engaging notches are alternately disposed.

9. The golf club head as claimed in claim 1, wherein each said engaging notch has a width of 1.5±0.2 mm.

10. The golf club head as claimed in claim 2, wherein each said examining notch has a width of 1.0±0.2 mm.

11. The golf club head as claimed in claim 1, wherein the supporting rods are fixed on an outer side of the striking plate by welding.

12. The golf club head as claimed in claim 1, wherein the supporting rods are integrally formed on an outer side of the striking plate as a single unit.

13. The golf club head as claimed in claim 2, wherein each side examining notch tapers outward.

14. The golf club head as claimed in claim 5, wherein each said examining notch is located in a middle between two of the engaging notches adjacent to each other.

15. The golf club head as claimed in claim 6, wherein each said examining notch is located in a middle between two of the engaging notches adjacent to each other.

16. The golf club head as claimed in claim 8, wherein each said examining notch is located in a middle between two of the engaging notches adjacent to each other.

* * * * *